US006778353B1

(12) United States Patent
Harper

(10) Patent No.: US 6,778,353 B1
(45) Date of Patent: Aug. 17, 2004

(54) BALANCE RING

(75) Inventor: Bruce M. Harper, San Jose, CA (US)

(73) Assignee: Komag, Inc., San Jose, CA (US)

( * ) Notice: Subject to any disclaimer, the term of this patent is extended or adjusted under 35 U.S.C. 154(b) by 0 days.

(21) Appl. No.: 10/712,548

(22) Filed: Nov. 12, 2003

Related U.S. Application Data

(62) Division of application No. 09/916,144, filed on Jul. 25, 2001, now abandoned.

(51) Int. Cl.$^7$ .......................... G01B 17/028; G01M 1/16
(52) U.S. Cl. .............................. 360/99.08; 360/99.12; 73/461; 73/468
(58) Field of Search .......................... 360/99.08, 99.12; 73/66, 461, 460, 468, 469, 470

(56) References Cited

U.S. PATENT DOCUMENTS

| | | |
|---|---|---|
| 5,243,481 A | 9/1993 | Dunckley et al. |
| 5,537,272 A | 7/1996 | Kazmierczak et al. |
| 5,659,443 A | 8/1997 | Berberich |
| 5,834,731 A | 11/1998 | Harper |
| 5,897,798 A | 4/1999 | Monberg et al. |
| 6,178,062 B1 | 1/2001 | Yim et al. |
| 6,189,371 B1 | 2/2001 | Hirano |
| 6,212,031 B1 | 4/2001 | Kazmierczak et al. |
| 6,226,146 B1 | 5/2001 | Landess et al. |
| 6,381,081 B1 | 4/2002 | Ford |

FOREIGN PATENT DOCUMENTS

| | | | | |
|---|---|---|---|---|
| DE | 3816975 A | | 11/1989 | |
| JP | 06044721 A | * | 2/1994 | ........... G11B/23/03 |
| JP | 09115216 A | | 5/1997 | |
| JP | 10247359 A | * | 2/1998 | ........... G11B/19/20 |
| JP | 11039786 A | * | 2/1999 | ........... G11B/19/20 |
| WO | WO 9326006 A1 | | 12/1993 | |

OTHER PUBLICATIONS

"Flexure Rings for Centering Lenses", NASA Tech Brief, vol. 26, No. 11 from JPL New Technology Report NPO-19518, Nov. 1, 2002, pp. 1, 1–6.

* cited by examiner

Primary Examiner—William J. Klimowicz
(74) Attorney, Agent, or Firm—Blakely, Sokoloff, Taylor & Zafman, LLP

(57) ABSTRACT

An apparatus and method for balancing a disk are described. A balance ring may be a circular band for placement along the inner diameter of a disk. On the outer diameter of the balance ring, one or more clamp structures may extend outward to attach the balance ring to the inner diameter of a disk. The inner diameter of the balance ring may have a number of protuberances that, when trimmed, establish a new rotational center of the disk/balance ring coincident with the mass center. The disk and balancing ring may be mounted on a disk balancing system to determine a mass center and trim the protuberances, accordingly, to establish adjust the rotational center of the disk/balance ring to be coincident with the mass center. The protuberances may be trimmed using, for example, laser energy.

8 Claims, 16 Drawing Sheets

BALANCE RING

REFERENCE TO RELATED APPLICATION

This application is a divisional of application Ser. No. 09/916,144 filled Jul. 25, 2001 now abandoned.

FIELD OF THE INVENTION

This invention relates to the field of disk drives and, more specifically, to mass balancing of disks for use in disk drive systems.

BACKGROUND OF THE INVENTION

A disk drive system typically consists of one or more magnetic recording disks and control mechanisms for storing data within approximately circular tracks on a disk. A disk is composed of a substrate and one or more layers deposited on the substrate. In most systems, an aluminum substrate is used. However, alternative substrate materials such as glass have various performance benefits such that it may be desirable to use a glass substrate.

To produce a substrate from a blank sheet of a brittle material such as glass, the material may be scribed to generate a substrate having an inner diameter (ID) and an outer diameter (OD). One method of generating a disk substrate is to laser scribe a controlled shape, such as a circle, into one surface (the scribe side) of a glass sheet to generate the ID and OD contours of the disk substrate. A fine crack is propagated along the contours during the laser scribing. After scribing, the disk-shaped substrate may be removed from the excess bulk material of the sheet by breaking the material along the scribed contours.

Because of the radial deviation of the scribe, the non-scribed side of the substrate may have a poorly defined diameter. The ID may result in inwardly or outwardly protruding spurs, as illustrated FIG. 1A, and sloping side walls. Spurs on the surface of the disk substrate adjacent the ID may be generated when the glass is fractured to remove the disk from excess bulk material. Also, the scribe lines have a tendency to overlap resulting in imperfections to the disk substrate. The radial deviation of the laser scribe may also result in a substrate having a non-circular ID, as illustrated in FIG. 1B. The ID imperfections may be especially problematic because the ID is mounted onto the spindle of the disk drive.

Such disk substrate imperfections may result in a disk substrate that is not mass-balanced, as illustrated in FIG. 1C. The mass center may be at point A, while the rotational center (substantially the ID geometric center at which the disk rotates when mounted) may be at point B. A disk having this type of substrate may encounter balancing problems when rotated on the spindle of a disk drive system. In order to ensure proper rotation of a disk on a spindle, the mass center of a substrate should be located at the rotational center at which the substrate rotates. Thus, a mass balanced disk is one in which the mass center of the disk equates to the rotational center of the disk. A mass balanced disk is functionally important, because newer disk drive systems require higher rotational speeds. A high rotational speed of an unbalanced disk may lead to poor performance or disk failure. In addition, proper balancing is also necessary to achieve high track density by enabling the read/write head to accurately follow data tracks on a disk.

Another problem of disk substrate scribing results from the ID having a greater size than the drive spindle in order to fit properly over the disk drive spindle. A gap between the ID of the disk and the spindle diameter is present, as illustrated in FIG. 2. causing the disk to be located eccentrically on the drive hub. It should be noted that off angle illustration of the disk in relation to the spindle is not meant to imply a loss of planarity but, rather, to highlight the gap between the disk ID and the spindle hub. The gap results in an offset between the disk's rotational center and the spindle's rotation center. If the ID were scribed to fit exactly around the spindle, the disk would most likely be in balance, However, because of manufacturing limitations, such precision may not be practical.

Although disks that are not mass balanced during manufacturing could be corrected in post-production steps, current methods to correct disk imbalance may be costly and time consuming. Additionally, in multiple disk systems, mass balancing may be even more complex and costly compared to single disk systems.

SUMMARY OF THE INVENTION

The present invention pertains to an apparatus and method for balancing a disk. In one embodiment, the apparatus may include a substantially circular band having a top surface, a bottom surface, an inner diameter surface and an outer diameter surface. The outer diameter surface of the band may have one or more clamp structures disposed thereon to couple the band to a disk with each of the one or more clamp structures radially extended away from the outer diameter surface of the band. The inner diameter surface may have a plurality of protuberances disposed thereon.

In one embodiment, the method may include coupling the band to the ID of a disk and trimming the protuberances to establish a new rotational center of the coupled disk and band coincident with the mass center of the disk/band.

Additional features and advantages of the present invention will be apparent from the accompanying figures and from the detailed description that follows.

BRIEF DESCRIPTION OF THE DRAWINGS

The present invention is illustrated by way of example, and not limitation, in the figures of the accompanying drawings in which.

DETAILED DESCRIPTION

Figure 1A:
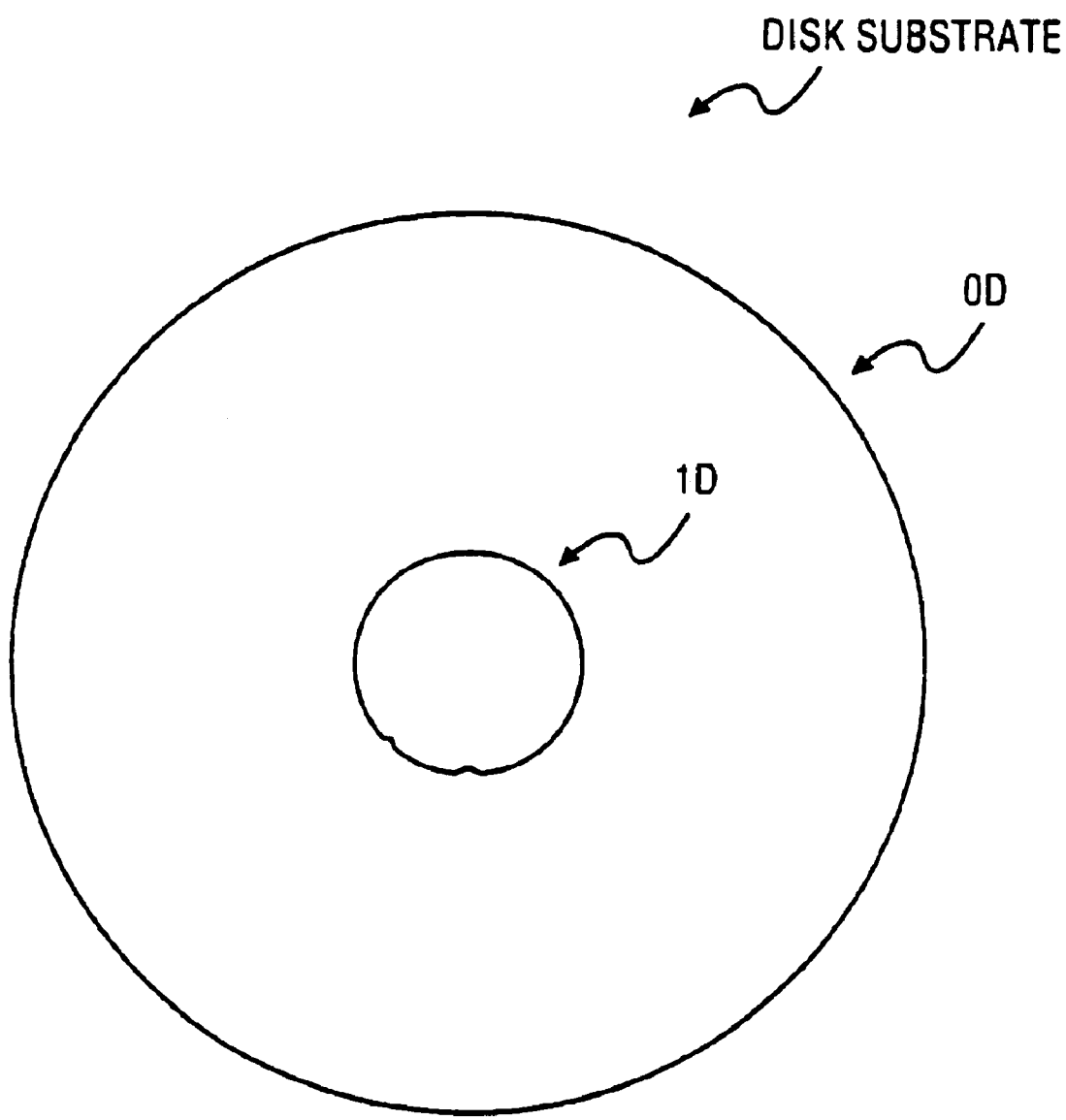
FIG. 1A illustrates a disk manufacturing problem of an ID that has protruding spurs.
Figure 1B:
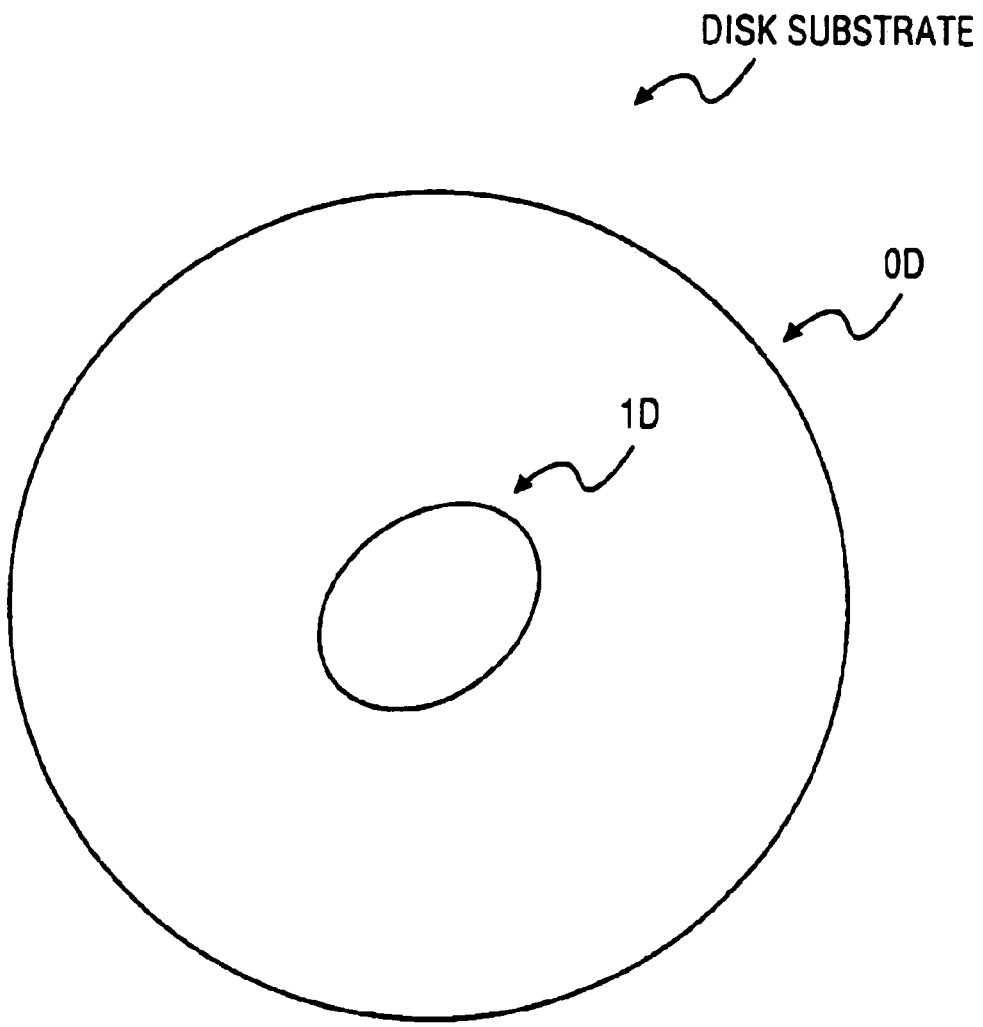
FIG. 1B illustrates a disk manufacturing problem of an ID that is not circular.
Figure 1C:
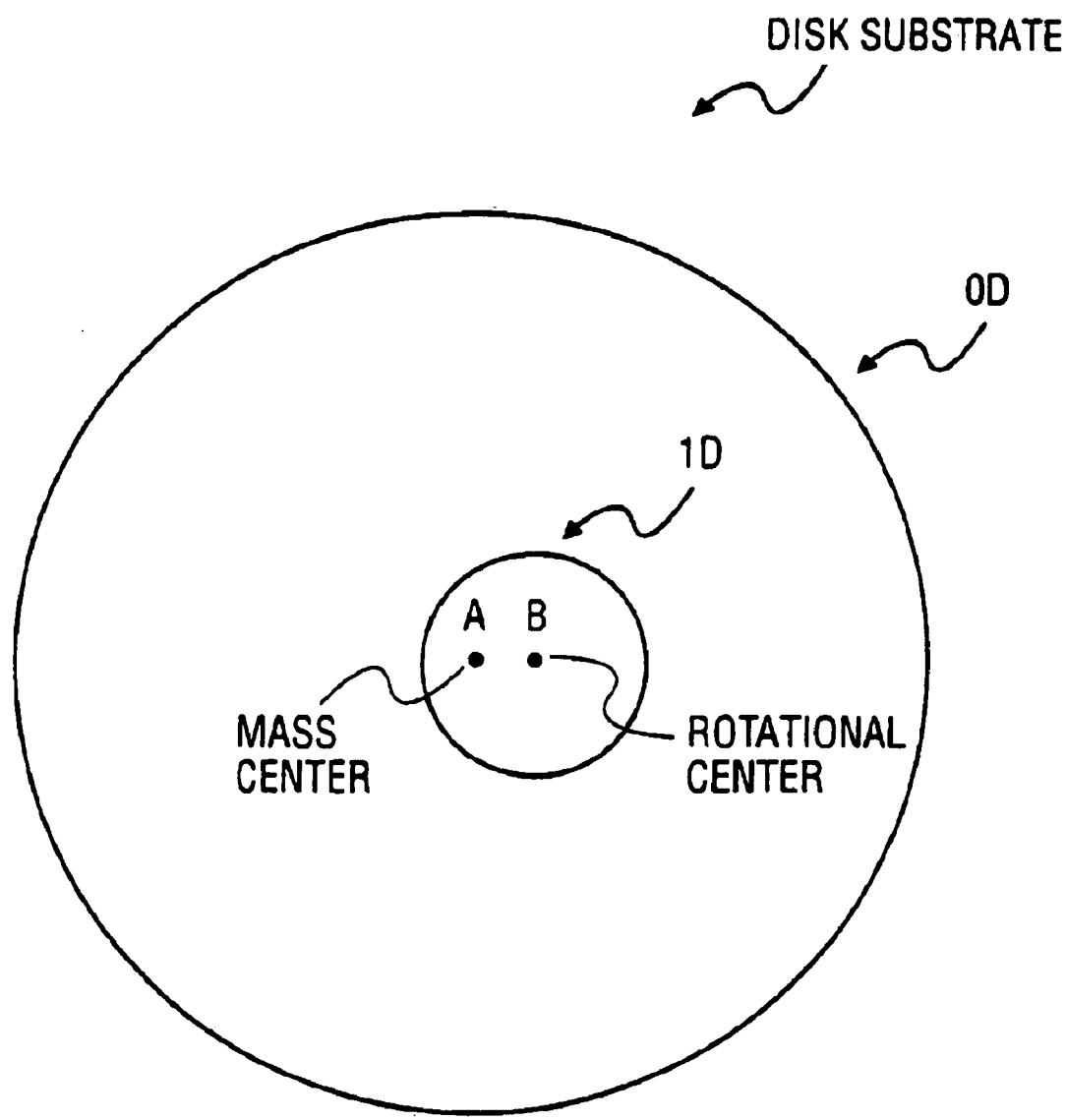
FIG. 1C illustrates a disk manufacturing problem of an ID that is not centered on the disk.
Figure 2:
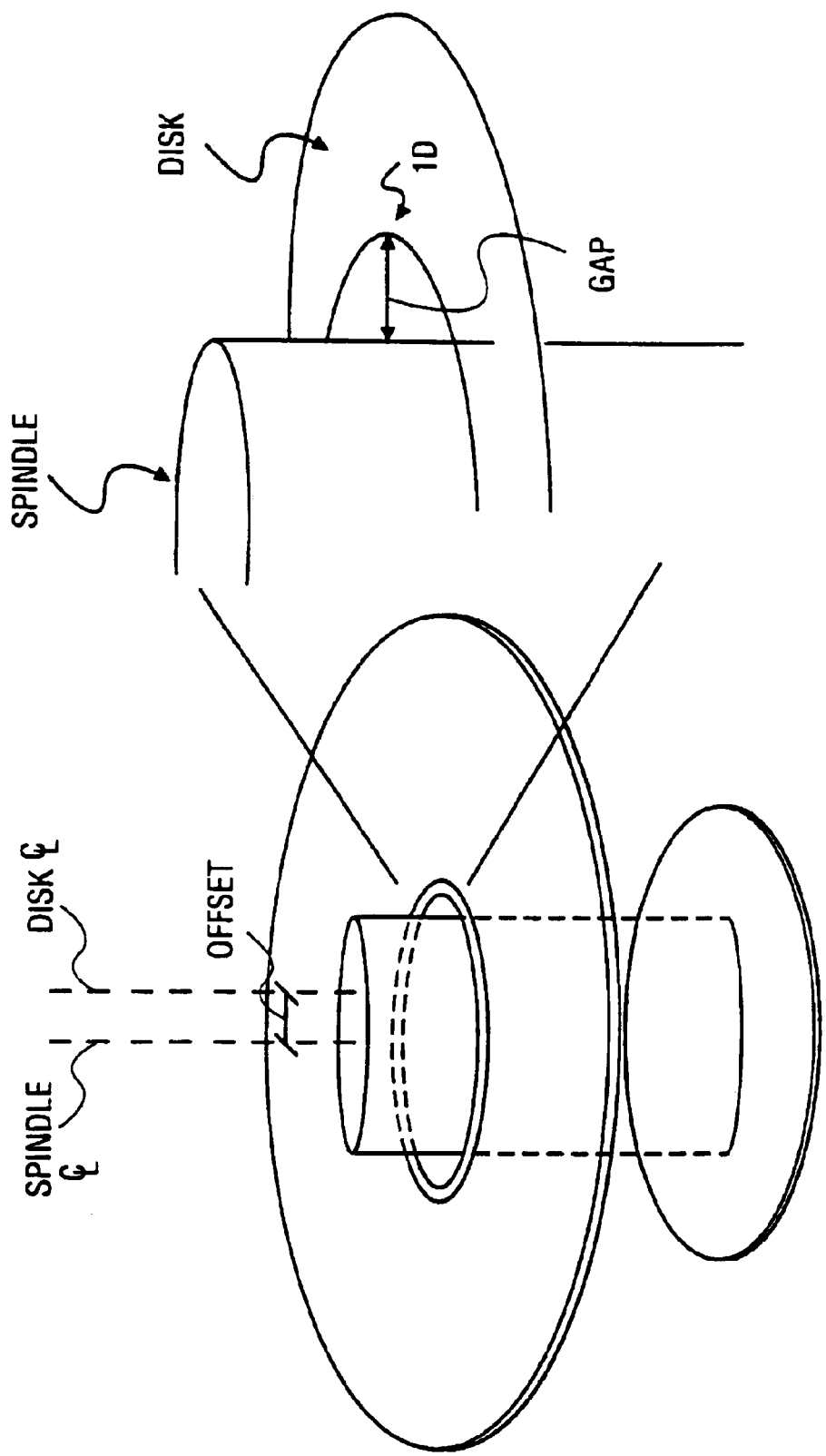
FIG. 2 illustrates a problem of gaps forming between the ID of a disk and a spindle caused by variations in disk manufacturing.

In the following description, numerous specific details are set forth such as examples of specific materials or components in order to provide a thorough understanding of the present invention. It will be apparent, however, to one skilled in the art that these specific details need not be employed to practice the invention. In other instances, well known components or methods have not been described in detail in order to avoid unnecessarily obscuring the present invention.

It should be noted that the apparatus and methods discussed herein may be used with various types of disks. In one embodiment, for example, the apparatus and methods discussed herein may be used with a magnetic recording disk. Alternatively, the apparatus and methods discussed herein may be used with other types of digital recording disks, for examples, a compact disc (CD) and a digital video disk (DVD).

In one embodiment, the apparatus and method described herein may be implemented with a glass substrate. Glass substrates that may be used include, for example, a silica containing glass such as borosilicate glass an aluminosilicate glass. It should be noted that the description of the apparatus and method in relation to a glass substrate is only for illustrative purposes and is not meant to be limited only to the balancing of glass substrates. In an alternative embodiment, other substrate materials including polymers, ceramics, and metals such as aluminum may be used.

Current disk substrate manufacturing methods may result in disks having irregularities with respect to the ID of the disk. These ID irregularities may cause the mass center of the disk to vary from the rotational center of the disk and, thereby, imbalance the disk when rotated on a spindle. Proper balancing of the disk is important for proper operation of the disk in a disk drive system.

In one embodiment, the method may include coupling a balance ring to the ID of a disk. The balance ring may be substantially circular in shape and have protuberances along its inner diameter. One or more clamp structures may be disposed on the outer diameter of the balance ring that extends outwardly to couple the balance ring to the ID of a disk. The disk, with the coupled balance ring, may be placed on a mass balancing machine to determine a new mass center of the disk. It should be noted that the mass of the balance ring may be negligible relative to the mass of the disk. As such, at times, reference may be made only to the mass center of a disk. However, such reference is intended to include the mass of the balance ring when it is coupled to the disk.

The mass balance point on the disk may not be the same as to the rotational center of the disk. As such, the protuberances on the balance ring may be trimmed to align the rotational center of the disk with the new mass center of the disk coupled with the trimmed balance ring. Trimming the protuberances may be achieved, for example, through the use of laser energy or thermal ablation. In another embodiment, the trimming of the protuberances may be achieved through mechanical means.

The trimmed protuberances occupy the space between the ID of the disk and a disk drive spindle. Minimizing the space between the ID of a disk and a disk drive spindle inhibits operational failures associated with the disk spinning eccentrically. The balance ring allows for a disk to be scribed without precision with respect to the size of the ID or OD, because the balance ring may be trimmed to provide an exact fit between the spindle and the disk, as well as mass balancing the disk. The balance ring may provide a very cost effective and simple way to mass balance a disk.

Figure 3:
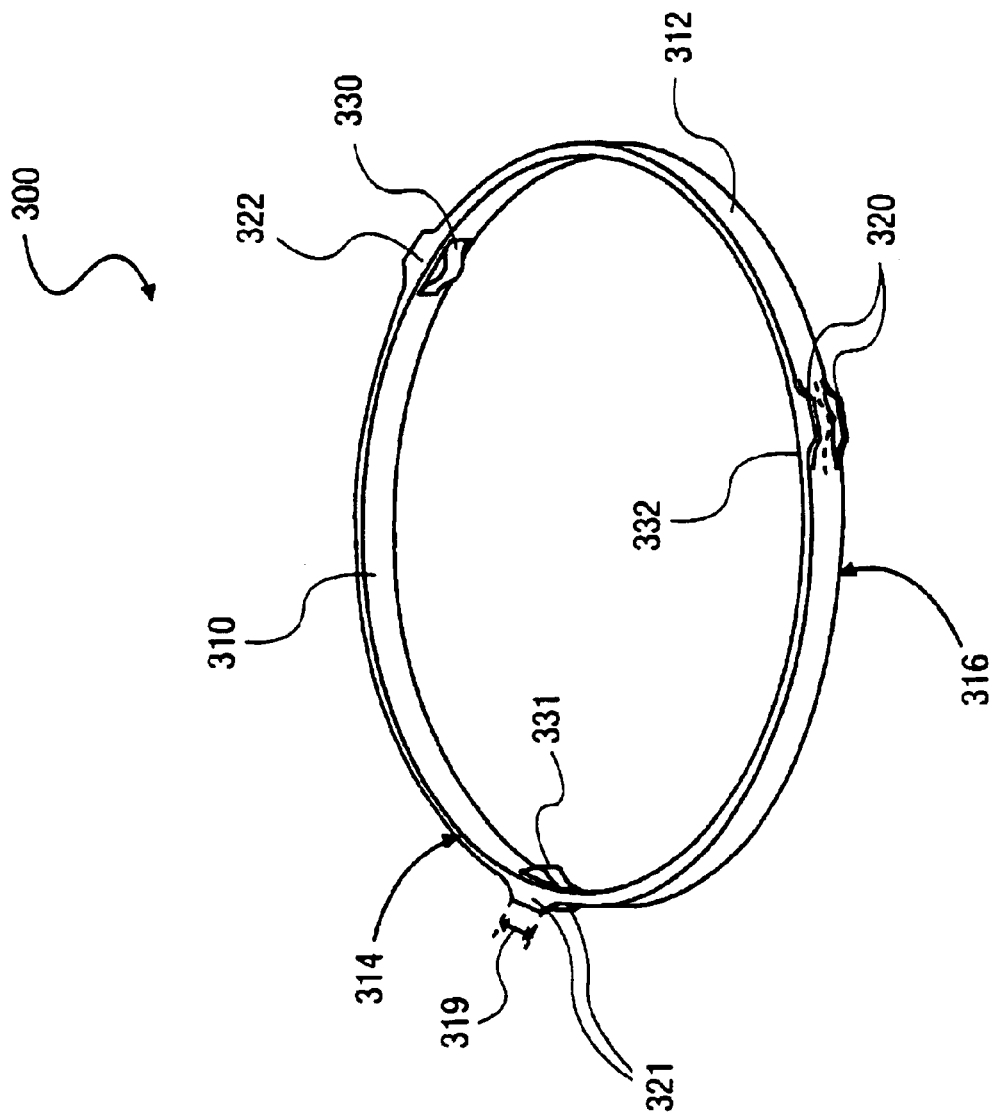
FIG. 3 illustrates a perspective view of one embodiment of a balance ring.
Figure 4:
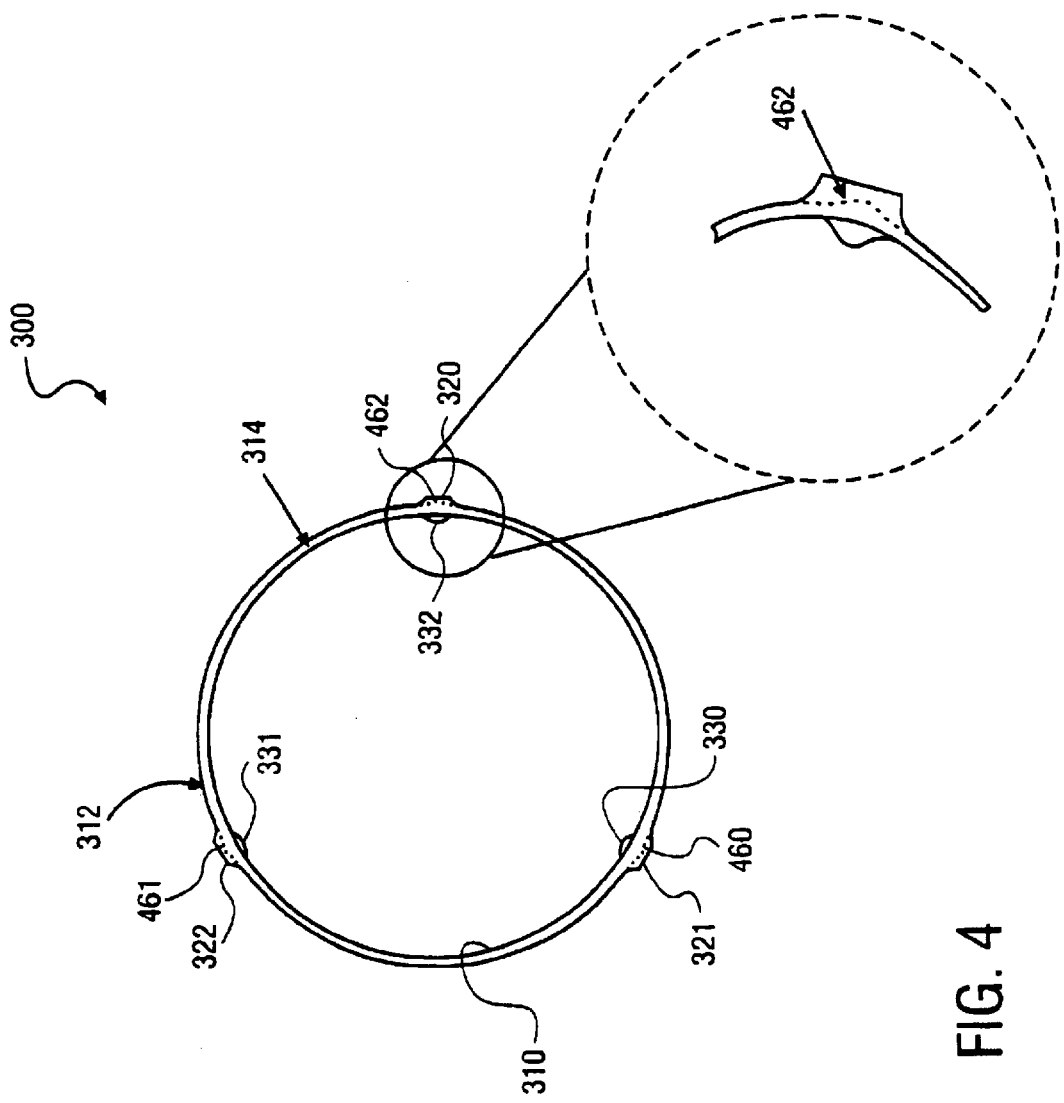
FIG. 4 illustrates a top view of the balance ring of FIG. 3.

FIG. 3 illustrates a perspective view and FIG. 4 illustrates a top view of one embodiment of a balance ring. Balance ring 300 is a band having a closed and substantially circular structure. The band is continuous as shown, but does not necessarily have to possess that limitation. Balance ring 300 has inner diameter surface 310 having an inner diameter, outer diameter surface 312 having an outer diameter, top surface 314 and bottom surface 316. Balance ring 300 also includes clamp structures along outer diameter surface 312.

In one embodiment, the clamp structures are pairs of flanges 320–322 (only a single flange of the pair shown for flange pair 322 of FIG. 3 and for the flange pairs illustrated in the top perspective of FIG. 4) that extend outwardly from top surface 314 and bottom surface 316 of balance ring 300. Each flange of flange pairs 320–322 has a circumferential length 319 to secure an ID of a disk (not shown) to the balance ring 300. Flange pairs 320–322 may also operate to prevent balance ring 300 from slipping through the ID of a disk. In another embodiment, balance ring 300 may include more or less than three clamp structures, for example, a single flange pair may extend around the entire periphery of balance ring 300.

In one embodiment, balance ring 300 includes three protuberances 330–332 along inner diameter surface 310. Protuberances 330–332 extend inwardly from inner diameter surface 310 of balance ring 300. In this embodiment, protuberances 330–332 and flange pairs 320–322 are displaced at the same radial locations of balance ring 300, with the sum of the angles between each of the protuberances (and, hence, each of the flange pairs) being greater than 180 degrees. Protuberances 330–332 are displaced along inner diameter surface 310 and flange pairs 320–322 are displaced along outer diameter surface 312. However, protuberances 330–332 may be positioned anywhere along inner diameter 310 of balance ring 300. Alternatively, protuberances 330–332 may be displaced at locations different from flange pairs 320–322. In an alternative embodiment, balance ring 300 may have more than three protuberances.

In the illustrated embodiment, protuberances 330–332 have tab-like shapes. It should be noted that other shapes for protuberances 330–332 may be used, for examples, circular and triangular. As long as protuberances 330–332 have protruding features that provide sufficient material to mechanically strength and stabilize coupling to the disk, balance ring 300 may be utilized to mass balance a disk.

With balance ring 300 is coupled to a disk, a mass center of the disk/balance ring may be determined. After the mass center of the disk with coupled balance ring 300 is determined, protuberances 330–332 may be trimmed to mass balance the disk so that the rotational center of the disk/balance ring is coincident with the mass center of the disk/balance ring 300 combination.

Referring to FIG. 4, in one embodiment, balance ring 300 may also include protuberances disposed on the outer diameter surface 312, for example, protuberances 460–462. Protuberances 460–462 may be disposed at approximately the same circumferential positions as protuberances 330–332 or, alternatively, at other positions along outer diameter surface 312. Protuberances 460–462 operate to provide a secure fit between balance ring 300 and an ID of a disk. In an alternative embodiment, more or less than three protuberances on the outer surface of the balance ring may be used to provide more or less than three points of contact between balance ring 300 and a disk. For example, a single point of contact may be provided by injection molding balance ring 300 to a disk. In yet another embodiment, a slight relief may be grooved along outer diameter surface 312 of balance ring 300 to provide a secure fit with an ID of a disk.

Figure 5:
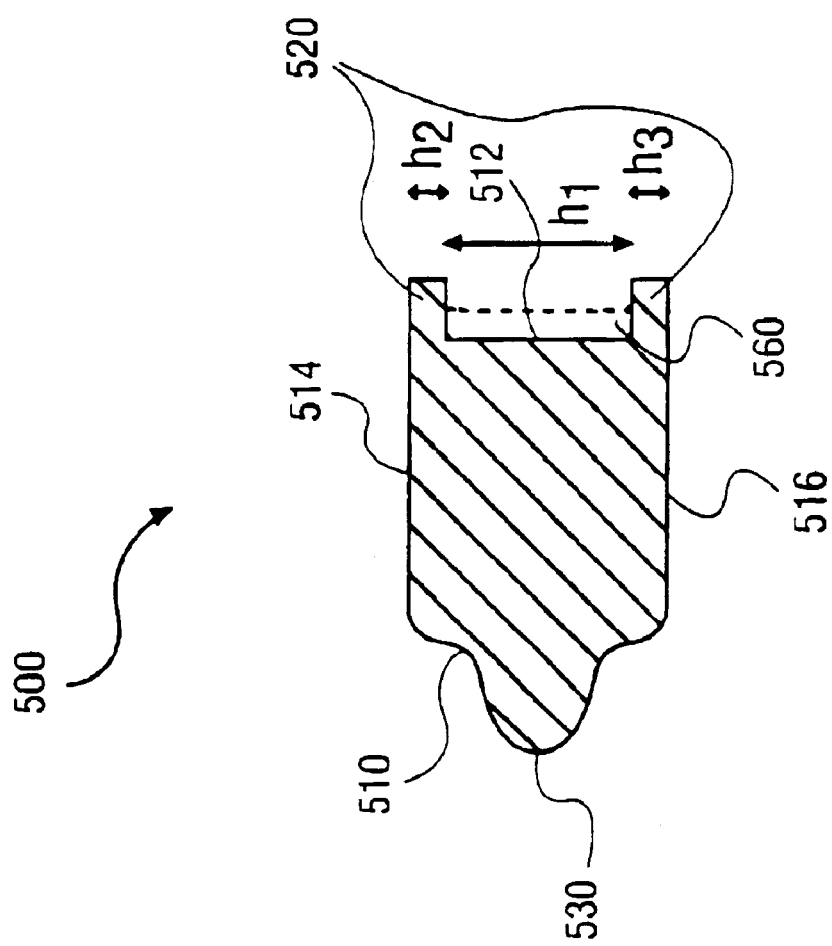
FIG. 5 illustrates a cross-sectional side view of the balance ring of FIG. 3.

FIG. 5 illustrates a cross-sectional side view of the balance ring of FIG. 3. This view crosses through a flange pair, a band, an inner diameter protuberance and an outer diameter protuberance. Balance ring 500 has inner diameter surface 510, outer diameter surface 512, top surface 514, bottom surface 516, flange pair 520, inner diameter protuberance 530, outer diameter protuberance 560, and band 540. Protuberance 530 extends radially toward a center of balance ring 500. Flange pair 520 extends radially from outer diameter 512. Balance ring 500 is configured such that an ID of a disk fits in the space within height $h_1$ of outer diameter surface 512. In one embodiment, flange pair 520 and protuberance 530 may be integrally formed with band 540. In another embodiment balance ring 500 has flange pair 520 and protuberance 530 that may be flexibly attached to band 540.

Flange pair 520 assists in maintaining a continuous contact between outer diameter surface 512 of balance ring 500 and the ID of a disk, while preventing balance ring 500 from slipping through the ID of the disk. In addition, balance ring 500 has a thickness $h_2$ formed by outer diameter surface 512 and top surface 514 and a thickness $h_3$ formed by outer diameter surface 512 and bottom surface 516. Thickness $h_2$ and thickness $h_3$ add to the total thickness of a disk when balance ring 500 is coupled to the disk.

The edge of outer diameter surface 512 is substantially vertical and approximately equal to the thickness of a disk to which balance ring 500 is to be coupled. In alternative embodiments, the outer diameter surface 512 may have other edge shapes, for example, a curved shape.

Figure 7:
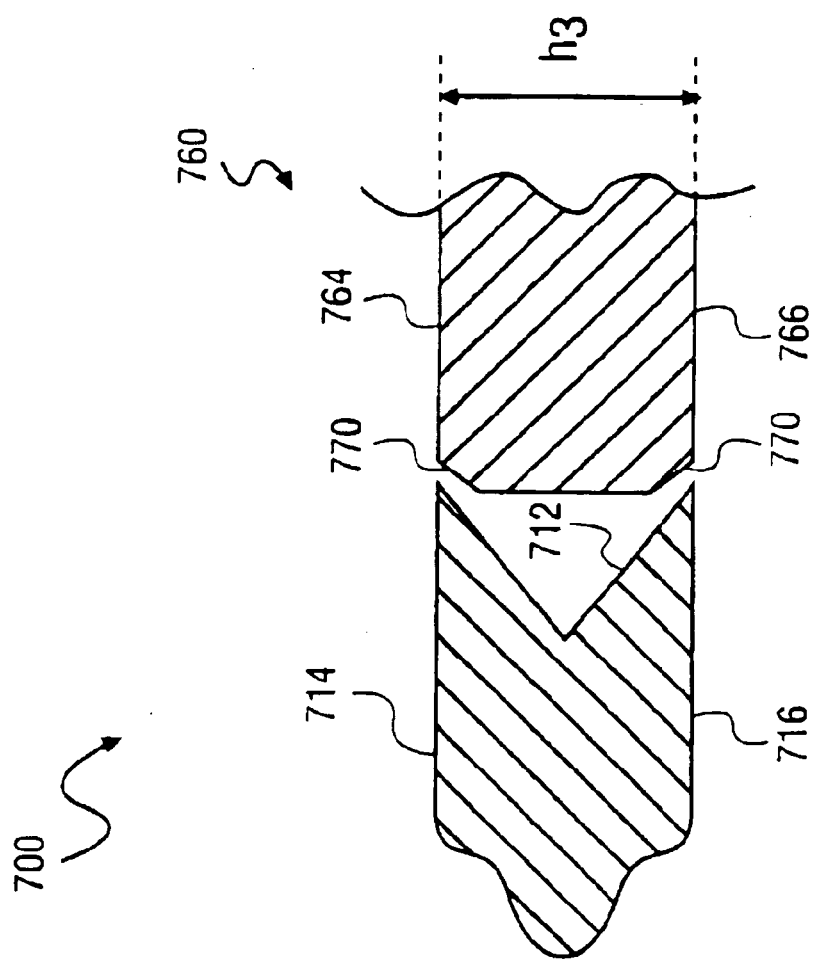
FIG. 7 illustrates a cross-sectional side view of yet another embodiment of a balance ring.

FIG. 7 illustrates yet another embodiment of a balance ring. In one embodiment, edge portions 770 of the ID surface of disk 760 may be chamfered inwardly towards outer diameter surface 712 of balance ring 700. As such, both the inner diameter surface 712 of balance ring 700 and disk 760 may have substantially the same thickness $h_3$. Alternatively, the inner surface 712 may be secured at other positions along the chamfered edges portions 770 such that the height of inner diameter surface 712 is less than the thickness of disk 760. This embodiment has the advantage of not having to modify the structure of a clamp so as to be disposed on top surfaces 714 and 764 of balance ring 700 and disk 760, respectively. As such, balance ring 700 may be easily incorporated into the assembly of a disk drive system.

Figure 8B:
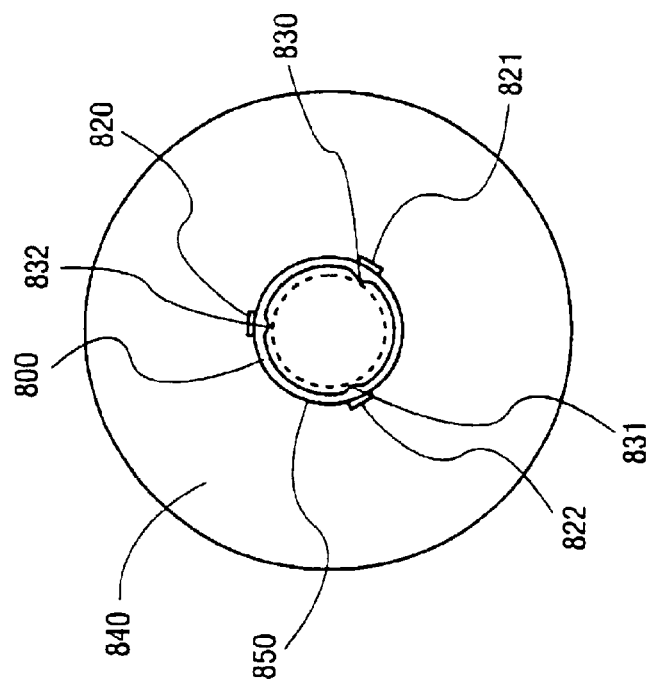
FIG. 8B illustrates one embodiment of a balance ring and disk after the trimming of the balance ring.
Figure 8A:
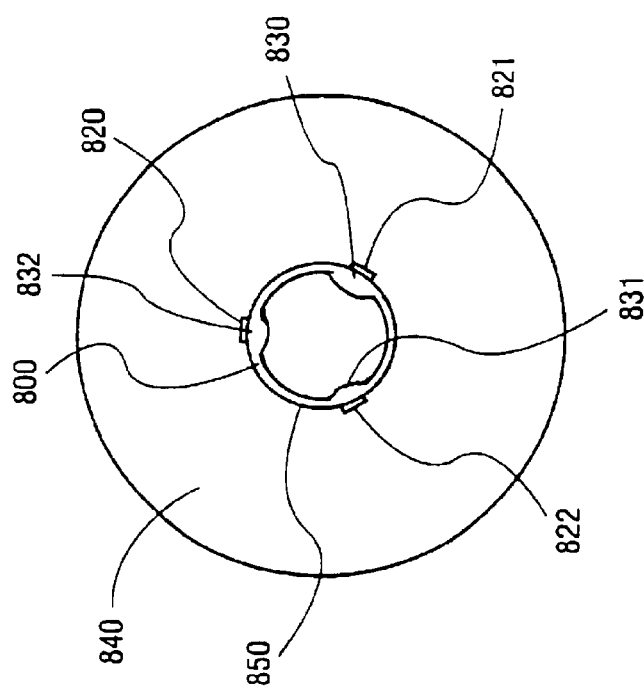
FIG. 8A illustrates one embodiment of a balance ring and disk before trimming of the balance ring.

FIGS. 8A and 8B illustrate an embodiment of the present invention in which a balance ring is coupled to a disk. FIG. 8A is a top view illustrating balance ring 800 and disk 840. Flange pairs 820–822 secure balance ring 800 to ID 850 of disk 840. Protuberances 830–832 extend inwardly from balance ring 800. This embodiment shows disk 840 before it is balanced by trimming protuberances 830–832.

FIG. 8B shows disk 840 after it is balanced. Protuberances 830–832 have been trimmed. In addition to realigning to rotational center to the mass center of disk 840 (coupled with the balance ring), balancing ring 800 also operates to fill part or all of a gap formed between the inner diameter of the disk 840 and a disk drive spindle.

Figure 6A:
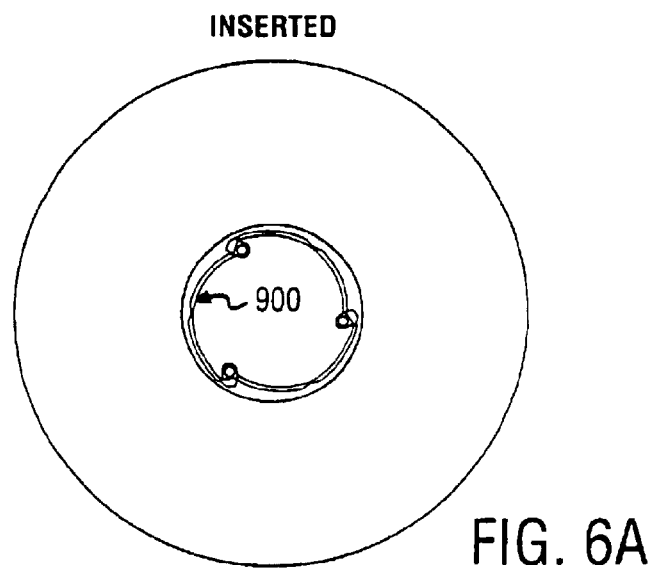
FIG. 6A illustrates one embodiment of a balance ring inserted into the inner diameter space of a disk.
Figure 6B:
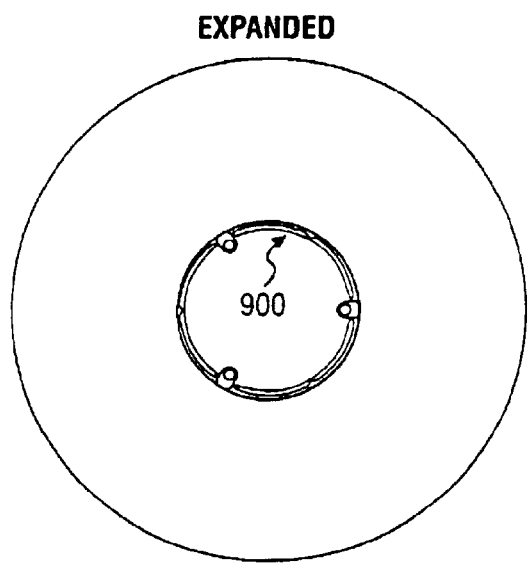
FIG. 6B illustrates one embodiment of a balance ring expanded to be coupled with a disk.
Figure 9A:
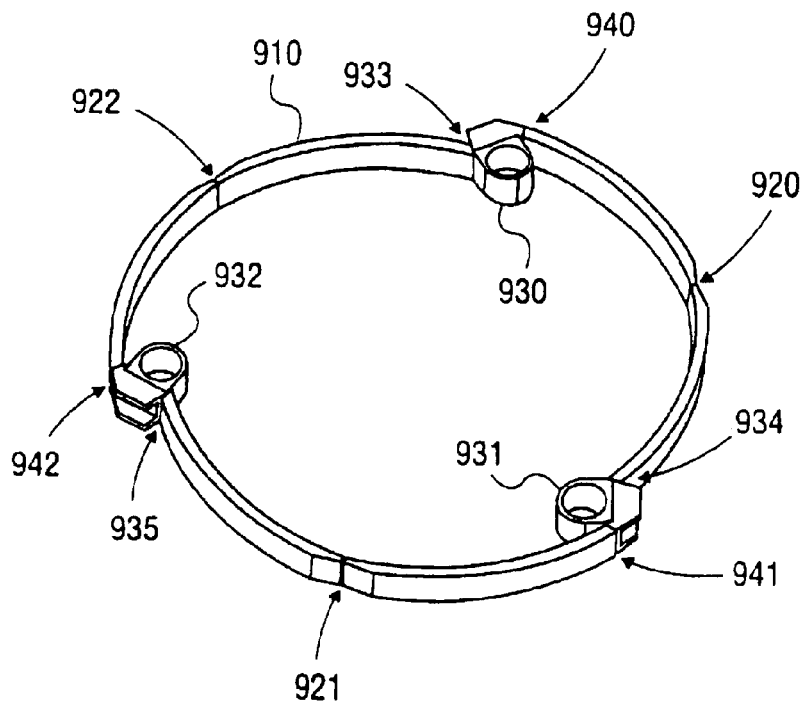
FIG. 9A illustrates one embodiment of a balance ring having loop structures for protuberances before trimming.

The protuberances on the balance ring may be achieved by alternative conformations and structures. FIG. 9A illustrates a perspective view of an embodiment of a balance ring with an alternative protuberance structure. The protuberances on balance ring 900 are formed as closed loops 930–932. The loops 930–932 extend from the hinges 940–942 of balance ring 900. Hinges 940–942, 933–935, and 920–922 may be integrated with balance ring 900 and are shown in a collapsed state. Hinges 940–942, 933–935, and 920–922 operate to alter the structure of balance ring 900 so that it may be inserted within the ID of the disk (illustrated in FIG. 6A) and then expanded to be coupled with a disk (illustrated in FIG. 6B). Such a hinge structure may be referred to as a "living hinge."

Figure 6C:
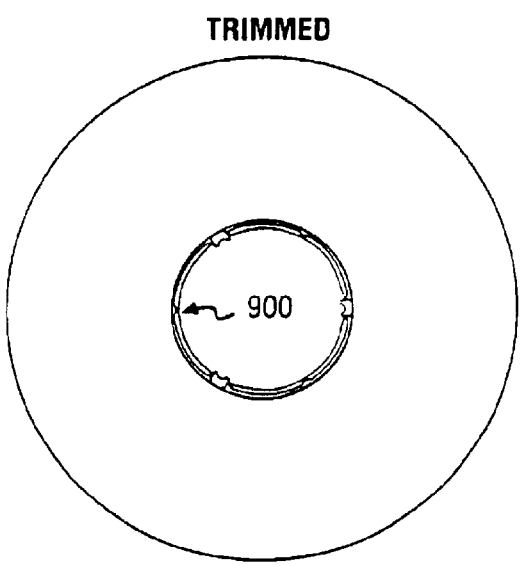
FIG. 6C illustrates one embodiment of a balance ring coupled with a disk after the loop structures of the balance ring have been trimmed.
Figure 9B:
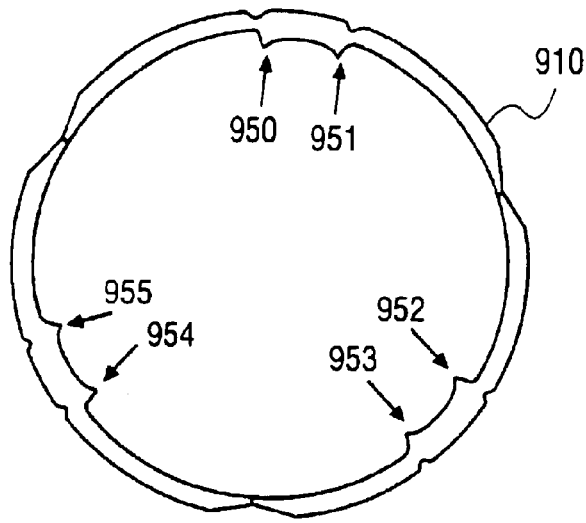
FIG. 9B illustrates one embodiment of the balance ring of FIG. 9A after the loop structures have been trimmed.

FIG. 9B illustrates the living hinge balance ring after the protuberances have been trimmed to mass balance a disk. Loops 930–932 of FIG. 9A, when trimmed, become open structures having contact areas. For example, loop 930 of FIG. 9A, when trimmed has two contact areas 950 and 951 with a disk spindle. In this embodiment, balance ring 900 has three loops 930–932 of FIG. 9A that, when trimmed, provide 6 areas of contact 950–955. Such protuberances operate to align the mass center of the disk, to which balance ring 900 is coupled (as illustrated in FIG. 6C), with the rotational center of the disk when the combination is rotated on a drive spindle. In an alternative embodiment, loops 930–932 may be open loops such that a segment of the loop may be omitted. For example, an open loop may have a form similar to the post-trimming, open structures illustrated in FIG. 9B.

Figure 10:
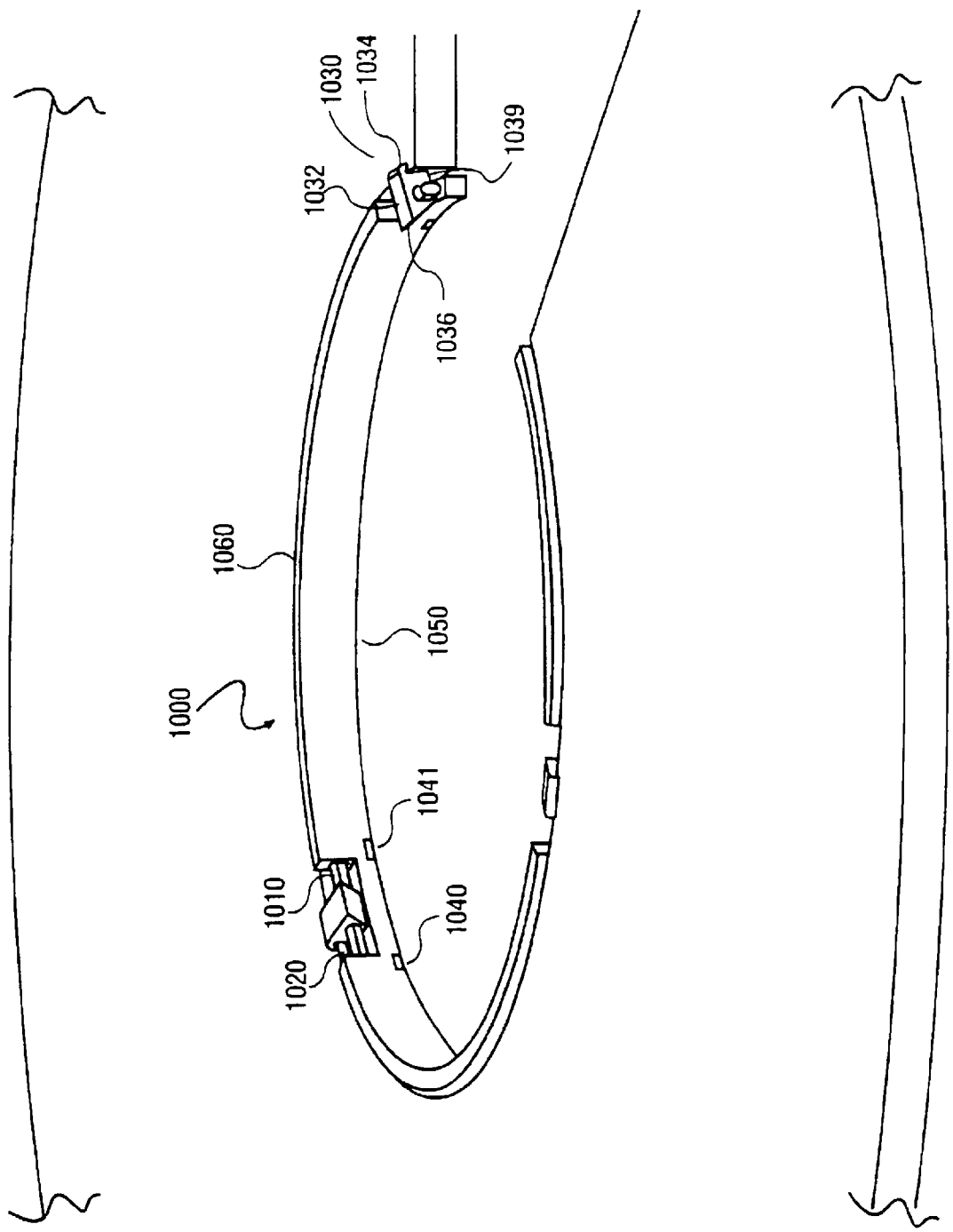
FIG. 10 illustrates one embodiment of a balance ring having a toggle clip.

FIG. 10 illustrates a perspective and partial cross-sectional view of a balance ring having an alternative protuberance structure. Balance ring 1000 includes annular ring 1010 within a circumference of balance ring 1000. Notch 1020 along balance ring 1000 expose a portion of annular ring 1010. Annular ring 1010 operates as a torsion beam such that the protuberances flex about annular ring 1010. Alternatively, rather than having the form of a unitary piece, each exposed portion of annular ring 1010 may be a separate pin member.

In the illustrated embodiment, the protuberances are formed with clamp structures 1030 having top surface 1032 that extends past a circumferential thickness of balance ring 1000 and is also angled downward towards the center of balance ring 1000. Angled portion 1036 of top surface 1032 may be trimmed to balance a disk. The clip portion 1034 on top surface 1032 of clamp structure 1030 couples balance ring 1000 to one side of a disk. Clamp structures 1030 also include a heal portion 1039 disposed below the center of moment of annular ring 1010 in order to restraint the clip portion 1034 against the disk. On bottom surface 1050 of balance ring 1000, flanges 1040 and 1041 extend towards a disk. As such, clip portion 1034 and flanges 1040 and 1041 secure balance ring 1000 to a disk. This embodiment is referred to as the "toggle clip" design.

To couple the "toggle clip" balance ring along the ID of the disk, clamp structure 1030 is rotated about its supporting element(s) axis or toggled downward towards bottom surface 1050 balance ring 1000 until top surface 1032 is parallel with inner diameter 1060 of balance ring 1000. This position provides enough clearance for balance ring 1000 to be inserted along an ID of a disk. Flanges 1040 and 1041 extending from bottom surface 1050 of balance ring 1000 is pushed flush against the corresponding surface of a disk. Clamp structure 1030 may then be toggled upwards so that clip portion 1034 couples to a surface of a disk opposite the side in contact with flanges 1040 and 1041.

Figure 11:
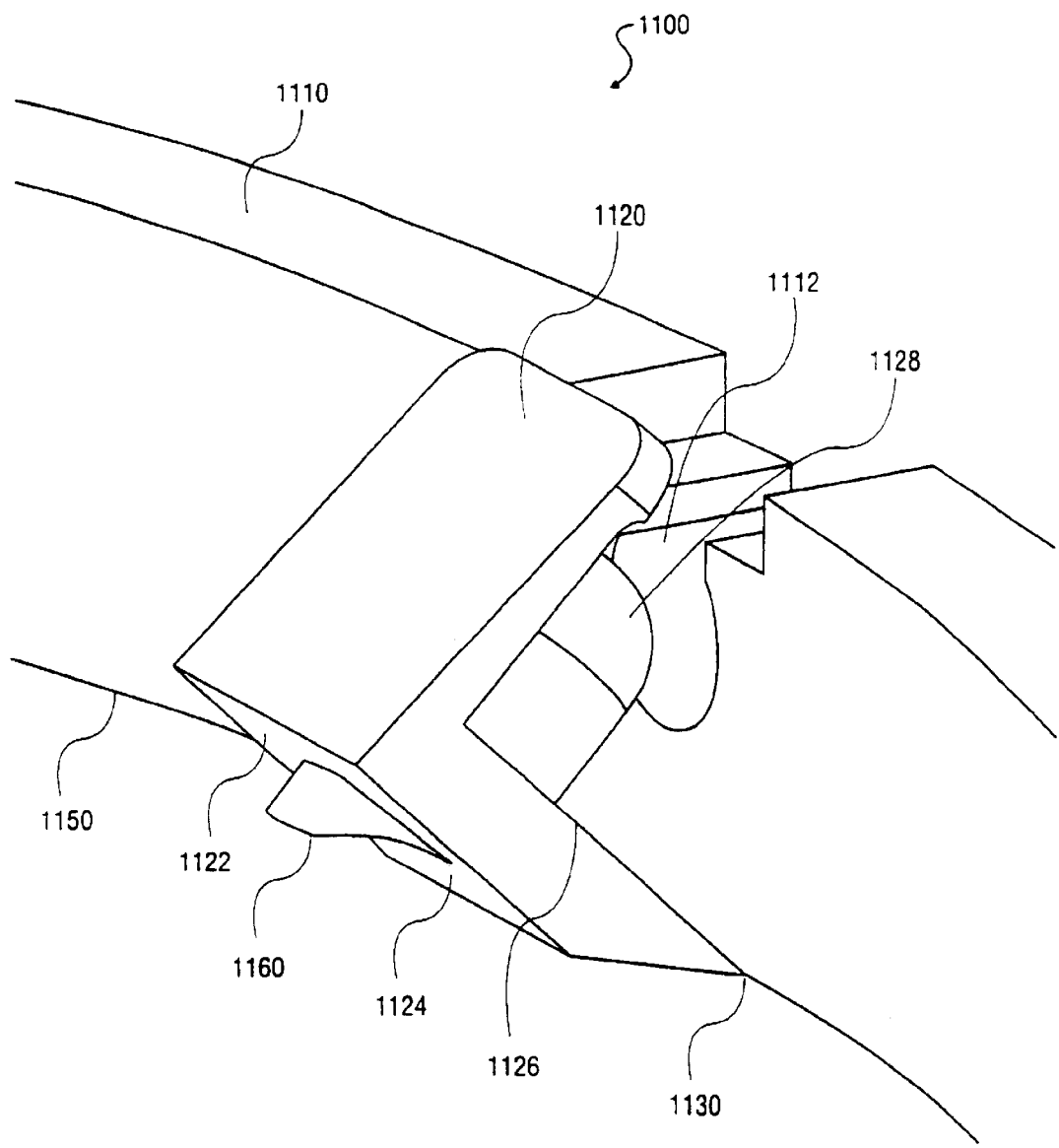
FIG. 11 illustrates one embodiment of a balance ring having a snap clip.

FIG. 11 illustrates perspective view of a balance ring having an alternative protuberance structure. Balance ring 1100 has hinges (not shown) similar to hinges 940 as described for FIG. 9A. The protuberances are connected to bottom edge 1150 of inner diameter 1140 of balance ring 1100. Protuberances 1120 of balance ring 1100 has hinge 1130 that allows protuberance 1120 to swing upwardly toward upper surface 1110 of balance ring 1100. Protuberance 1120 has top surface 1122, inner surface 1124 and outer surface 1126. When rotated completely towards upper surface 1110 of balance ring 1100, outer surface 1126 has slug 1128 that snaps into notch 1112 near upper surface 1110 of balance ring 1100. Top surface 1122 of protuberance 1120 extends to form a flange to secure a disk. Bottom surface 1150 of balance ring 1100 has an extending flange that is separate from the flange formed by top surface 1120 of protuberance 1100. Inner surface 1124 of protuberance 1100 has tab 1160 extending away from inner surface 1124 of balance ring protuberance 1100. Tab 1160 may be trimmed to mass balance a disk with coupled balance ring 1100. This embodiment is referred to as the "pivoting snap" design.

Although any number of protuberances may be part of the balance ring, three protuberances may provide the optimum structure for balancing the disk, as well as acting as a spacer for fitting the disk on a disk drive spindle. To gain a known reference to a hub, one tab may not provide any control and two tabs may provide constraint in only one horizontal direction with respect to the plane of the disk on a hub. Having three tabs may fully constrain the disk on a hub. However, more than three protuberances may be utilized. Alternatively, a single protuberance extending along the entire ID of a disk may be utilized.

The balance ring may be made of injection molded material, such as plastic. Plastics add minimal weight to the disk, as well as being cost effective with respect to adding new material for disk production. The deformable yet resilient properties of plastic allows for the balance ring to be compressed for placement along the ID of a disk. Thus, even though the balance ring is temporarily compressed, the balance ring attempts to retain the original shape when released. When fitted along against an ID of a disk, the outer diameter of the balance ring is in at least 3 points, or continuous, contact with the ID of the disk. The balance ring is not limited to an injected molded plastic material. Alternatively, other materials having resilient properties may be used to make the balance ring, for examples, rubber and metal.

The protuberances described in all the embodiments may be easily trimmed. As such, once a true mass balance is determined for a disk/balance ring, the protuberances on the balance ring may be trimmed through a variety of techniques, such as laser trimming, thermal ablation, ultrasonic ablation, or mechanical grinding. Another feature of the protuberances is to close any gaps between a disk hub and the ID of the disk.

Figure 12:
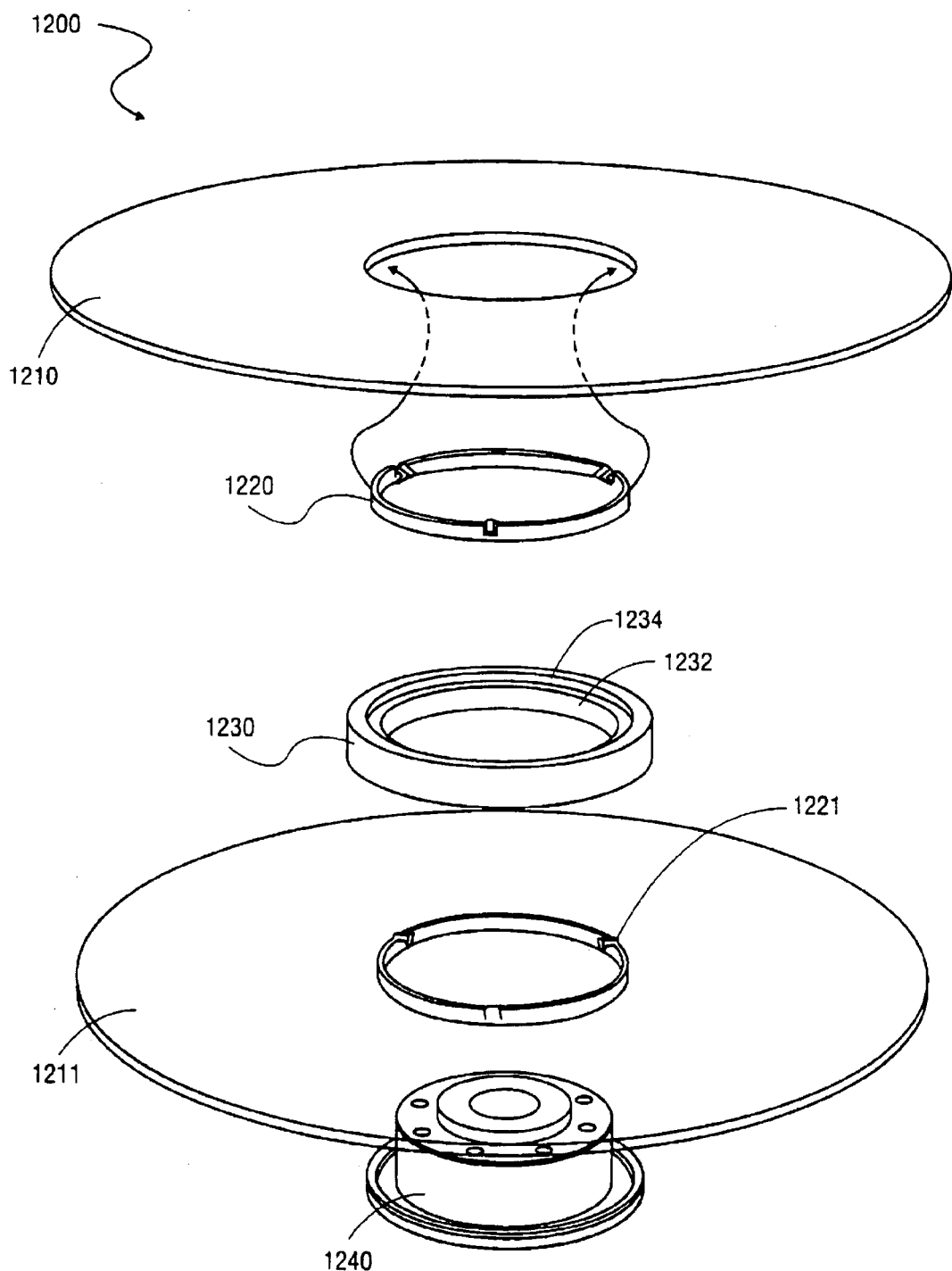
FIG. 12 illustrates one embodiment of a spindle assembly having balanced disks.

FIG. 12 illustrates an exploded view of one embodiment of multiple disks mounted on spindle. The spindle assembly includes one or more disks 1210 and 1211, balance rings 1220 and 1221, disk clamp 1230, and spindle 1240. Disk clamp 1230 has a circular structure that covers both balance ring 1220 and disk 1210 to secure balance ring 1220 and disk 1210 to spindle 1240. Disk clamp 1230 may also acts as a spacer between multiple disks 1210 and 1211. Disk clamp 1230 has first inner diameter 1232. Depending on the type of balance ring utilized, disk clamp 1230 may require a second inner diameter 1234 to accommodate an additional thickness from balance ring 1220. A relief formed between first inner diameter 1232 and second inner diameter 1234 provides clearance for balance ring parts such as flanges and protuberances.

Figure 13:
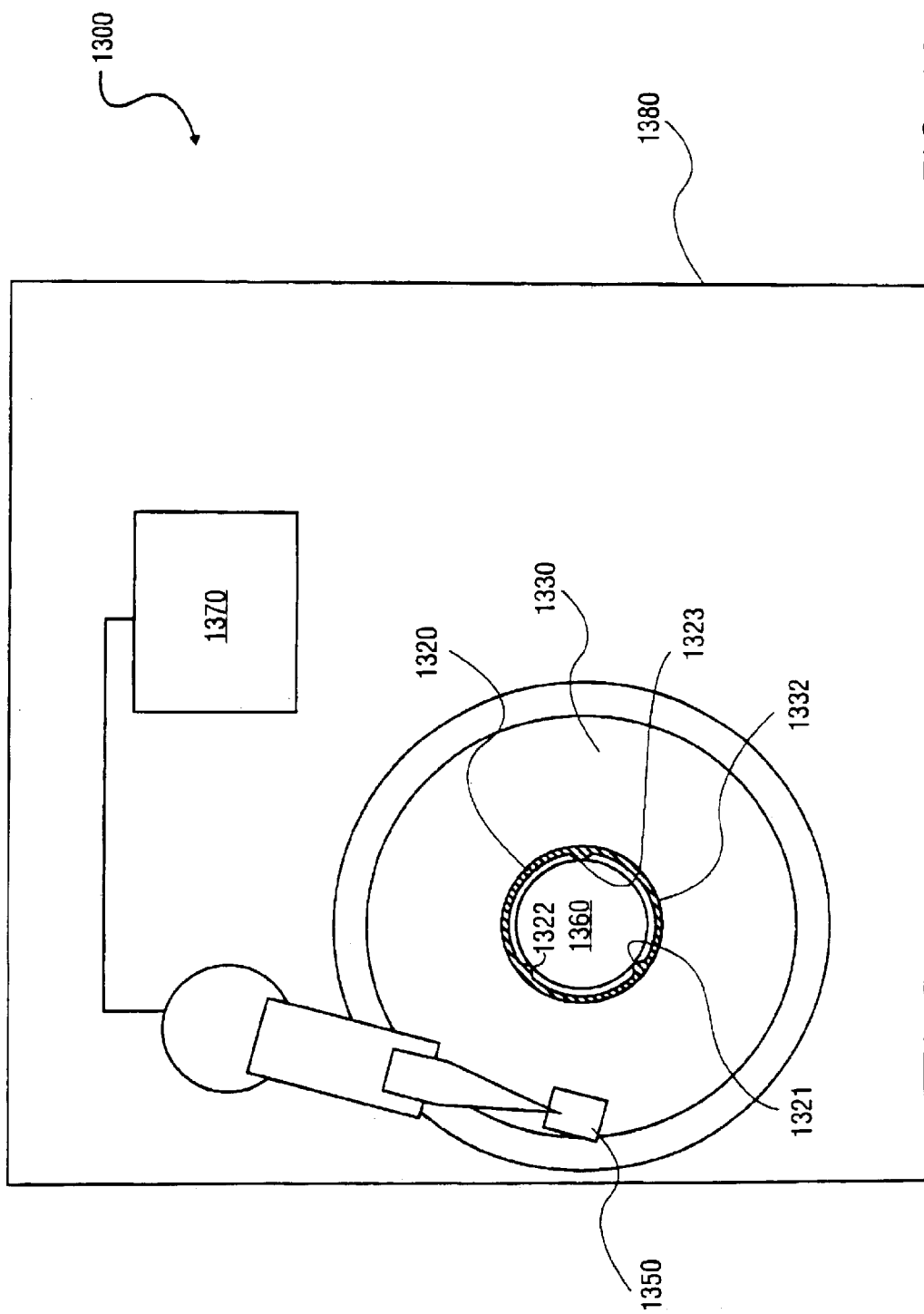
FIG. 13 illustrates one embodiment of a disk drive having a mass balance disk.

FIG. 13 illustrates one embodiment of a disk drive having a mass balanced disk. Disk drive 1300 may include one or more disks, such as disk 1330 to store data. Disk 1330 is composed of balance ring 1320 placed along ID 1332 of disk 1330. Balance ring includes protuberances 1321–1323. In one embodiment, balance ring 1320 may be utilized and formed using the apparatus and methods described above in relation to FIGS. 3–11.

Disk 1330 resides on a spindle assembly 1360 that is mounted to disk drive housing 1380. A spindle motor (not shown) rotates spindle assembly and, thereby, disk 1330 to position head 1350 at a particular location along a desired disk track. The position of head 1350 relative to disk 1330 may be controlled by position control circuitry 1370.

Figure 14:
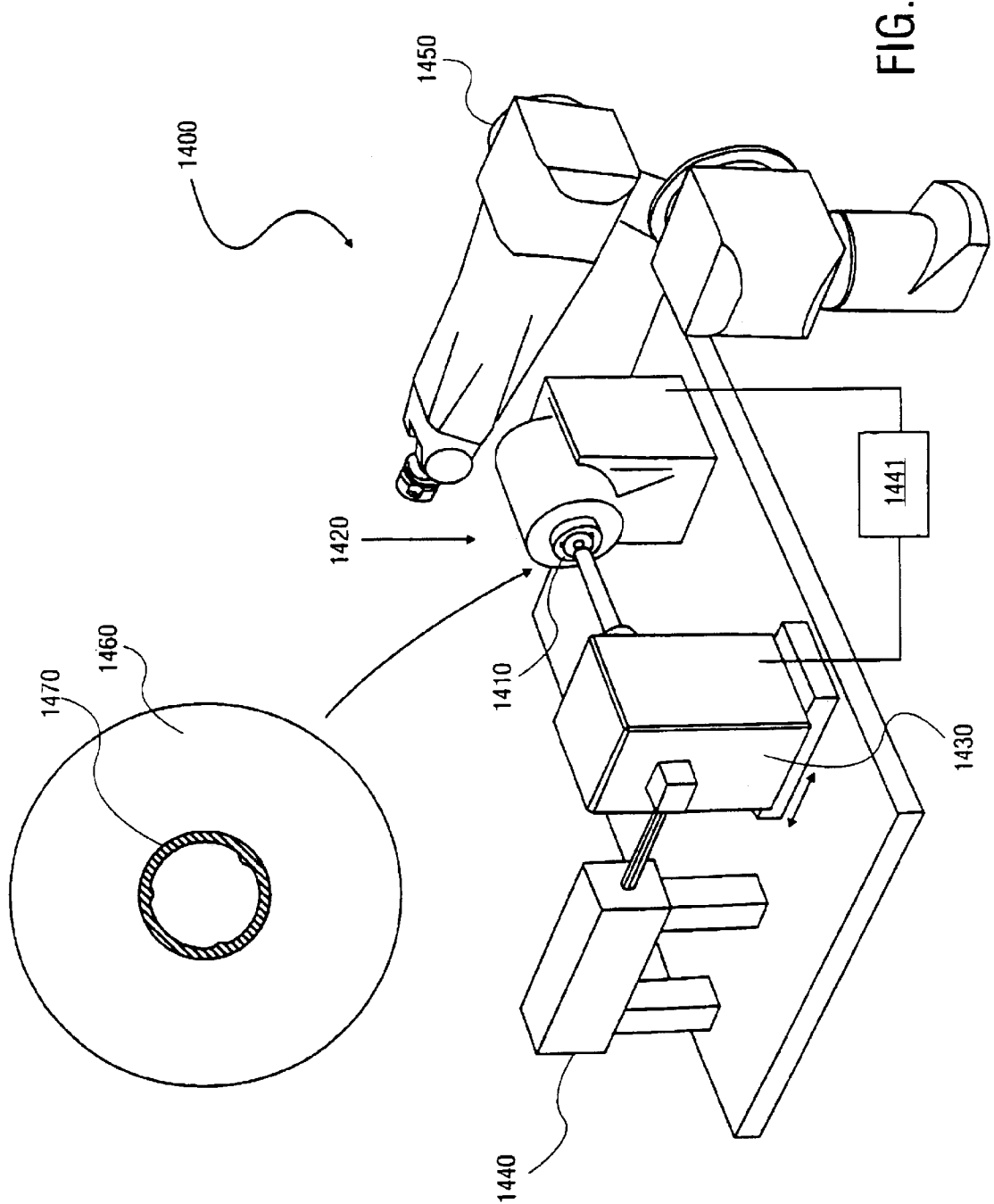
FIG. 14 illustrates one embodiment of a disk balancing system.

FIG. 14 illustrates an embodiment of a balancing system for balancing a disk. In one embodiment, balancing system 1400 includes spindle 1410 for holding disk 1460 in place so that a mass balance may be determined by mass balance machine 1420. Mass balance machine 1420 is able to spin the disk and determine the location of the mass center of the disk. If the disk is not balanced, the mass center of the disk may differ from the rotational center of the disk.

In one embodiment, balancing machine 1420 may include a laser 1440, a movable stage 1430, a controller 1440, and a rotatable spindle 1410. Movable stage 1430 includes optical components to direct a laser beam from a laser source, or a variation thereof, such as a Galvanometer to balance ring 1470. Controller 1440 is connected to movable stage 1430 to control targeting positions of the beam generated by laser 1440, as discussed below. Optionally, a loading robot 1450 may be part of balancing system 1400 to automatically place disks on spindle 1410.

A disk 1460 coupled with balance ring 1470 is loaded onto balancing machine 1420 in front of a movable stage 1430. Balance ring 1470 may be the balance ring discussed in all the previous figures. The disk 1460/balance ring 1470 is secured to spindle 1410. Disk 1460 may be secured in a number of ways including, for examples, through vacuum forces from spindle 1410 or through coupling to the OD of disk 1460.

Balancing machine 1420 determines through a control algorithm the mass center of disk 1460. Balancing machine 1420 instructs spindle 1410 to rotate disk 1460 to a horizontal azimuth with the mass center on the horizontal azimuth. The location and corresponding offset of the mass center from the rotational center, now on the horizontal azimuth, is relayed to controller 1440. Controller 1440 adjusts stage 1430 to target a laser beam from laser 1440 towards the protuberances on balance ring 1470. The trimmed protuberances establish a new center of rotation of disk 1460/balance ring 1470 coincident with its mass center.

A Galvanometer utilizes a series of x-y mirrors (horizontal-vertical) that are electronically controlled to trim any number of configurations with a laser beam. In a simpler method, the Galvanometer may include just one mirror that moves the laser beam to a x position relative to the center of the disk, and the balance ring could index each tab to a horizontal alignment. The laser beam could then be reflected in and out to give a specific radius for each of the protuberances.

A laser is not the only trimming source that may be used. In alternative embodiments, other trimming methods may be used. For example, for thick protuberances, a laser source may not be desirable because of the pinpoint focusing nature of lasers. In addition, vapors resulting from trimming the protuberances may have adverse effects on disk integrity. In an alternative embodiment, the protuberances may be trimmed using a thermal system. A heat source may be used to ablate thermally the protuberances. Another alternative source may be ultrasonic energy. In another embodiment, the protuberances may be mechanically grinded; for example, a diamond burr may be used to trim the protuberances with the debris suctioned off.

A method to establish a rotational center a disk coincident with its mass center of the disk is described. A balance ring is coupled to an ID of a disk. Disk balancing protuberances are positioned along an inner diameter of the balance ring. The mass center of the disk with the coupled balance ring is then determined and the protuberances are trimmed to align the rotational center of disk/balance ring to be coincident with its mass center.

In the foregoing specification, the invention has been described with reference to specific exemplary embodiments thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method, comprising:

coupling a band to a disk, the disk having a mass center and a rotational center, the band comprising a plurality of protuberances;

rotating the disk to identify the mass center for the disk; and trimming the plurality of protuberance of band to establish a new rotational center of the coupled disk and band coincident with the mass center of the disk.

2. The method of claim 1, further comprising mounting the coupled band and disk on a disk drive spindle.

3. The method of claim 1, wherein identifying comprises;

transmitting information about the mass center to a controller; and rotating the disk to a horizontal azimuth with the mass center on the horizontal azimuth using the controller.

4. The method of claim 3, wherein trimming further comprises positioning a trimmer opposite a planar surface of the disk, the trimmer moveable along an axis parallel to the horizontal azimuth with the mass center on the disk, and the trimmer targeting the plurality of protuberances on the band.

5. The method of claim 1, wherein coupling to the band to the disk comprises clamping an outer diameter surface of the band to the disk.

6. The method of claim 1, wherein trimming comprises removing a portion of the plurality of protuberances using a laser.

7. The method of claim 1, wherein trimming comprises thermally ablating a portion of the plurality of protuberances.

8. The method of claim 1, wherein trimming comprises mechanically grinding a portion of the plurality of protuberances.

* * * * *